Figure 1:
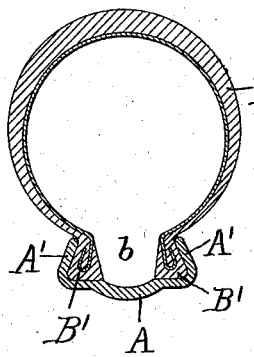

(No Model.)

T. B. JEFFERY.
WHEEL TIRE.

No. 558,957.  Patented Apr. 28, 1896.

Witnesses.
E. T. Wray.
Jean Elliott.

Inventor.
Thos. B. Jeffery
by Burton & Burton
his attys

UNITED STATES PATENT OFFICE.

THOMAS B. JEFFERY, OF CHICAGO, ILLINOIS.

WHEEL-TIRE.

SPECIFICATION forming part of Letters Patent No. 558,957, dated April 28, 1896.

Application filed December 9, 1893. Serial No. 493,221. (No model.)

*To all whom it may concern:*

Be it known that I, THOMAS B. JEFFERY, a citizen of the United States, residing at Chicago, county of Cook, and State of Illinois, have invented certain new and useful Improvements in Wheel-Tires, which are fully set forth in the following specification, reference being had to the accompanying drawings, forming a part thereof.

This invention relates to tires for wheels, such as are commonly called "pneumatic tires."

In the drawings all the figures are sections, radial with respect to the wheel, through the tire and wheel-rim embodying my invention in different forms.

Figure 2:
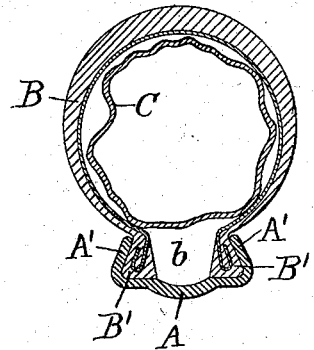
Figure 4:
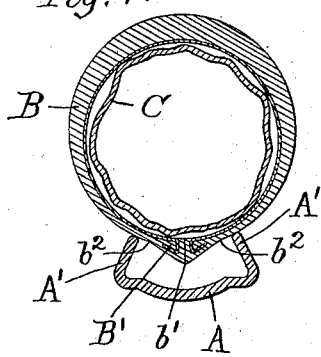
Figure 3:
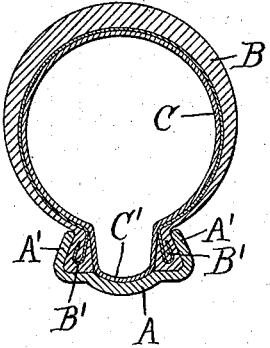
Figure 6:
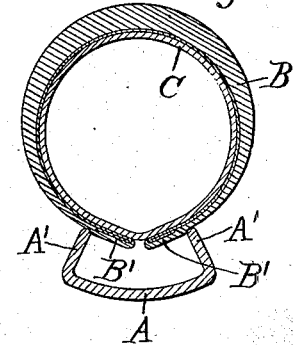
Figure 5:
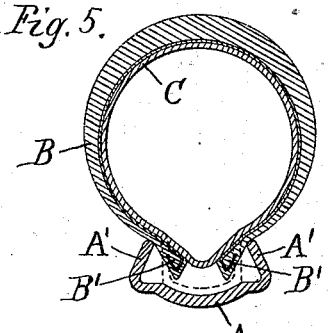
Figure 7:
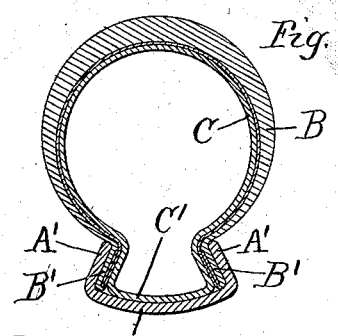

Figure 1 shows the rim and the sheath seated therein without the inflatable core. Fig. 2 shows the same form of rim and sheath with the core uninflated within the sheath. Fig. 3 shows the same form with the core fully inflated. Figs. 4 and 5 show a very slightly modified form of sheath. The first shows the sheath with the uninflated core within it placed on the rim preparatory to inflation. The second shows the same after inflation of the core has proceeded to a point sufficient to fill the circular portion of the sheath and slightly spread it and commence the downwardly folding of the lips, which, when the process is complete, become fully engaged with the rim. The dotted lines in this figure show the position of complete inflation, which is also substantially that which is shown in Fig. 3. Fig. 6 shows a still further slightly-modified form with the core partly inflated. Fig. 7 shows the same form with the core fully inflated.

A is the rim, B the sheath, and C the core in all the forms illustrated. The rim A has lateral flanges A' A', which are preferably somewhat inturned toward each other, so that they overhang more or less the intervening portion of the rim. The sheath B is open at the inner circumference, and may be so made by being rifted after being molded without an opening; but this is a matter of preference or judgment on the part of the maker not vitally material to this invention. In all the forms illustrated its construction is such that when the core is inflated and the tire is fully seated in the rim lips or flanges B' B' extend from the margins of the opening b at the inner circumference of the sheath, which is also substantially from a line subtending the gap in the rim—that is, connecting the edges of the flanges A' A'—toward the axis of the wheel, such lips or flanges standing inside the lips or flanges A' A', respectively, and being held against them by a portion of the core which occupies the interval between them, the edges of the flanges A' A' being virtually fulcrums in a lever action which takes place when the inflation of the core occurs, whereby the lips or flanges B' of the sheath, which are inward from said fulcrum, become lever-arms or lever edges, against which the inflation of the core operates to hold such lever edges firmly against the flanges A' A' of the rim in opposition, to some extent, to the tendency of the inflation of the circular portion of the tire and to any side wrenches which the tire may receive in riding which might tend to unseat it from the rim by causing disengagement of the sheath from the flanges of the rim. The tire may be molded with these lips B' B' projecting toward the axis of the wheel in the position and relation to the remainder of the tire which they are designed to occupy when the tire is fully seated in the rim. Such a form or method of construction is designed to be represented in Figs. 1, 2, and 3. This form of tire will be placed in the rim with the uninflated core within it, as seen in Fig. 2, and the core being inflated will extend an inflated bead or tongue C' down into the gap between the lips B', and the longer these lips are the more leverage they will afford for the action of the expansive tendency of the core outwardly against them to hold them into proper engagement with the rim-flanges.

In Figs. 4 and 5 there is represented the form or mode of construction which does not differ essentially from that in Figs. 1, 2, and 3 after inflation has taken place, but which may be molded in the first instance in the form in which it appears in Fig. 4, with an enlargement at the inner circumference, which, being divided (or molded with a division) at the line b', constitutes the two lips or flanges B' B'. As the core is inflated it will first, after filling the circular portion of the sheath, cause the latter to spread slightly at the line $b'$ until the root or commencement of enlargement at $b^2$ reaches the edge of the flange $A'$. Further inflation causes the tire to stretch downward through the gap, folding the lips $B'$ $B'$ outward toward the flanges, as seen in Fig. 5, and further inflation will fully seat the lips against the flanges, as seen in dotted lines in Fig. 5, the core at that stage entirely occupying the interval between them, as shown in Fig. 3 and by the dotted lines in Fig. 5. In this form the lever action of the flanges is more distinctly observable, because in the inflation movement of this lever is produced; but the character of these lips as lever edges tending to multiply the efficiency of the outward tension of the inflated core to hold the lips in engagement with the rim is as fully exhibited in fact in the form shown in Figs. 1, 2, and 3.

In both the forms thus far described it will be observed that the lips are approximately wedge-shaped—that is, they widen from the root or junction with the body of the sheath toward the ends or edges—so that when the core is fully inflated they constitute two dovetails seated between the coverging retaining-surfaces—viz., on one side the overhanging flange $A'$ and on the other side the lateral surface of the inflated tongue or bead $C'$ of the core. Such a form probably has greater efficiency by reason of this dovetail characteristic; but this characteristic is not absolutely vital, and the leading feature of the lever action afforded by "lever edges," as I term these lips $B'$, is shown also in Figs. 6 and 7, wherein the lips are substantially the same width throughout, but are adapted to fold apart and be forced against the flanges $A'$, as seen in Fig. 7. It is, however, desirable, in order to prevent the sheath from being dislodged from the rim before the inflation of the core has commenced to fold the lips, that there should be at the point at which the folding is to occur some slight offset or shoulder or angle on the outer surface to detain the sheath, as it may be caused to slide outward as the core expands and check such sliding movement for an instant, so that the inflation of the core thereafter, instead of spreading the sheath bodily, will cause the lips to fold inwardly, and as soon as this folding commences the danger of further spreading is at an end.

The value and effect of the lips $B'$ of the sheath as affording leverage against the force tending to wrench them out of their seats in the rim over the fulcrum edges of the flanges $A'$ is not wholly dependent upon the inflatable character of the tongue or bead $C'$, which the core forces down into the interval between them; but I regard the bead or tongue developed by the inflation of the core and partaking of that inflation as specifically preferable, because it permits the simplest form of core and because the inflated bead or tongue exerts positive force by pressure outward against the lips as well as negative force by mere resistance to the inward bending of the lips, which might dislodge them, and I therefore claim specifically the inflated bead, but do not limit all my claims to its inflated character.

I claim—

1. In a wheel, in combination with the rim having lateral flanges which define a peripheral recess in the rim, the sheath open at the inner circumference and adapted to overhang and seat upon the edges of the flanges, and having lips which extend inwardly from the lines of seating adapted to fold at such lines toward the center of the wheel, and when so folded to extend inside the flanges of the rim and seat thereagainst, the inflatable core within the sheath adapted by inflation to fold the lips as described and force a tongue, rib or bead into the interval between them in the rim: substantially as set forth.

2. In a wheel, in combination with the rim having lateral flanges inturned toward each other defining a peripheral recess in the rim, the tire-sheath open at the inner circumference to receive an inflatable core, the sheath being adapted to overhang and seat on the edges of the flanges, and having lips which, when the core is inflated extend within such recess in the rim from the lines of seating at the edges of the flanges toward the axis of the wheel and against the flanges, leaving an interval between them, the core being adapted when inflated to extend a tongue or bead down into said interval and press against the inwardly-facing surfaces of said lips to hold the latter against the flanges of the rim: substantially as set forth.

3. In a wheel, in combination with the rim having lateral flanges defining a peripheral recess in the rim, a tire-sheath open at the inner circumference to receive an inflatable core, the sheath being adapted to overhang and seat upon the edges of the flanges, and having enlargements extending inwardly from the lines of seating and forming outwardly-facing shoulders at such lines of seating, the portions extending inwardly from such shoulders and lines of seating constituting lips adapted to be folded toward the center of the wheel, and when so folded, to extend inside the flanges of the rim and seat thereagainst; and the inflatable core within the sheath adapted by inflation to fold the lips as described, and to force a tongue, rib or bead into the interval between them in the rim: substantially as set forth.

4. In a wheel, in combination with a rim having lateral flanges defining a peripheral recess in the rim, a tire-sheath open at the inner circumference to receive an inflatable core; the sheath being adapted to seat on the edges of the flanges, and having lips which, when the core is inflated, extend within such recess in the rim from the lines of seating at the edges of the flanges toward the axis of the wheel, leaving an interval between them in such recess; the core being adapted when inflated to extend an inflated portion in the form of a tongue or bead down into said interval and occupy the same, and press outwardly against the inwardly-facing surfaces of the lips: substantially as set forth.

In testimony whereof I have hereunto set my hand, in the presence of two witnesses, at Chicago, Illinois, this 6th day of December, 1893.

THOS. B. JEFFERY.

Witnesses:
CHAS. S. BURTON,
JEAN ELLIOTT.